United States Patent
Kamijoh et al.

(10) Patent No.: US 10,929,617 B2
(45) Date of Patent: Feb. 23, 2021

(54) TEXT ANALYSIS IN UNSUPPORTED LANGUAGES USING BACKTRANSLATION

(71) Applicant: INTERNATIONAL BUSINESS MACHINES CORPORATION, Armonk, NY (US)

(72) Inventors: Kohichi Kamijoh, Tokyo (JP); Tetsuya Nasukawa, Kanagawa-ken (JP); Yohei Ikawa, Kanagawa-ken (JP); Masaki Ono, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/040,818

(22) Filed: Jul. 20, 2018

(65) Prior Publication Data

US 2020/0026761 A1 Jan. 23, 2020

(51) Int. Cl.
*G06F 40/58* (2020.01)
*G06F 40/30* (2020.01)
*G06F 40/253* (2020.01)
*G06Q 30/02* (2012.01)
*G06F 40/51* (2020.01)

(52) U.S. Cl.
CPC ............ *G06F 40/58* (2020.01); *G06F 40/253* (2020.01); *G06F 40/30* (2020.01); *G06F 40/51* (2020.01); *G06Q 30/0254* (2013.01)

(58) Field of Classification Search
CPC ............... G06F 17/274; G06F 17/2785; G06F 17/2854; G06F 17/289; G06F 40/253; G06F 40/30; G06F 40/51; G06F 40/58; G06Q 30/0251; G06Q 30/0254
USPC .................................................... 704/2, 7, 9
See application file for complete search history.

(56) References Cited

U.S. PATENT DOCUMENTS

| | | | |
|---|---|---|---|
| 7,107,206 B1 * | 9/2006 | Uchida | G06F 17/2872 704/2 |
| 8,543,563 B1 * | 9/2013 | Nikoulina | G06F 16/243 707/706 |
| 9,788,777 B1 * | 10/2017 | Knight | A61B 5/165 |
| 2004/0153311 A1 * | 8/2004 | Liu | G06F 40/242 704/10 |
| 2005/0021323 A1 | 1/2005 | Li | |
| 2005/0071152 A1 * | 3/2005 | Morimoto | G06F 17/2765 704/10 |
| 2007/0005337 A1 * | 1/2007 | Mount | G06F 16/35 704/2 |
| 2007/0033002 A1 | 2/2007 | Dymetman et al. | |

(Continued)

OTHER PUBLICATIONS

Brislin, Richard W. "Back-translation for cross-cultural research." Journal of cross-cultural psychology 1.3, Sep. 1970, pp. 185-216. (Year: 1970).*

(Continued)

*Primary Examiner* — James S Wozniak
(74) *Attorney, Agent, or Firm* — Tutunjian & Bitetto, P.C.; Randall Bluestone (57) ABSTRACT

Text analysis includes determining one or more global analysis parameters based on backtranslation of a first corpus between supported languages. A new text analysis model is determined for an unsupported language based on the one or more global analysis parameters and a text analysis model for a first supported language. An input text is analyzed in the unsupported language with the new text analysis model.

15 Claims, 4 Drawing Sheets

(56) References Cited

U.S. PATENT DOCUMENTS

| | | | | |
|---|---|---|---|---|
| 2008/0208565 | A1* | 8/2008 | Bisegna | G06F 17/28 704/4 |
| 2009/0222409 | A1* | 9/2009 | Peoples | G06F 16/3331 |
| 2009/0326911 | A1* | 12/2009 | Menezes | G06F 17/2827 704/2 |
| 2010/0114562 | A1* | 5/2010 | Hutchinson | G06F 17/2229 704/9 |
| 2010/0274552 | A1* | 10/2010 | Gao | G06F 17/2854 704/2 |
| 2011/0093272 | A1* | 4/2011 | Isobe | G10L 13/10 704/258 |
| 2014/0288915 | A1* | 9/2014 | Madnani | G06F 17/274 704/2 |
| 2014/0303960 | A1 | 10/2014 | Orsini et al. | |
| 2014/0344276 | A1* | 11/2014 | Wei | G06F 16/285 707/737 |
| 2014/0350913 | A1* | 11/2014 | Cheng | G06F 17/289 704/2 |
| 2014/0358524 | A1* | 12/2014 | Papula | G06F 17/2854 704/9 |
| 2015/0264146 | A1* | 9/2015 | Cudak | G06F 16/9535 379/142.01 |
| 2016/0098480 | A1* | 4/2016 | Nowson | G06F 17/2785 707/738 |
| 2016/0283485 | A1 | 9/2016 | Nowak et al. | |
| 2017/0031901 | A1* | 2/2017 | Song | G06F 17/2705 |
| 2017/0091175 | A1* | 3/2017 | Kanayama | G06F 16/345 |
| 2017/0262431 | A1 | 9/2017 | Alam et al. | |
| 2017/0344532 | A1* | 11/2017 | Zhou | G06F 17/2881 |
| 2019/0018842 | A1* | 1/2019 | Nomura | G06F 17/289 |
| 2019/0197119 | A1* | 6/2019 | Zhang | G06F 40/49 |
| 2019/0213261 | A1* | 7/2019 | Mochida | G06F 17/2854 |
| 2019/0236147 | A1* | 8/2019 | Lee | G06F 17/2854 |
| 2020/0004787 | A1* | 1/2020 | Gupta | G10L 15/30 |

OTHER PUBLICATIONS

Lin, Yi-Hsiu, et al. "Cross-cultural research and back-translation." The Sport Journal 8.4, Sep. 2005, pp. 1-6. (Year: 2005).*

Rabinovich, Ella, et al. "Personalized machine translation: Preserving original author traits." arXiv preprint arXiv:1610.05461, Oct. 2016, pp. 1-11. (Year: 2016).*

Sennrich, Rico, et al. "Improving neural machine translation models with monolingual data." arXiv preprint arXiv:1511.06709, Nov. 2015, pp. 1-11. (Year: 2015).*

Microsoft Translator Text API, https://www.microsoft.com/en-us/translator/translatorapi.aspx, accessed on Apr. 18, 2018.

IBM Cloud DocsPersonality Insights, https://console.bluemix.net/docs/services/personality-insights/getting-started.html#gettingStarted, updated Jun. 20, 2018.

Transfer learning: Invitation to next frontier of machine learning, https://qiita.com/icoxfog417/items/48cbf087dd22f1f8c6f4, updated Jun. 24, 2017.

Teruhisa Misu et al., Semi-supervised Learning of an SLU module for English Spoken Dialog system by inducting Japanese User Queries, Jul. 2012.

François Mairesse et al., Using Linguistic Cues for the Automatic Recognition of Personality in Conversation and Text, Journal of Artificial Intelligence Research 30, Published Nov. 2007.

Giulio Biondi et al., A Deep Learning Semantic Approach to Emotion Recognition Using the IBM Watson Bluemix Alchemy Language, ICCSA 2017: Computational Science and Its Applications, Jul. 2017.

Fabio Celli et al., Workshop on Computational Personality Recognition: Shared Task, Association for the Advancement of Artificial Intelligence (www.aaai.org), Jul. 2013.

Jonathan Schler et al., Effects of Age and Gender on Blogging, Association for the Advancement of Artificial Intelligence (www.aaai.org), Aug. 2006.

Shachar Mirkin et al., Motivating Personality-aware Machine Translation, Proceedings of the 2015 Conference on Empirical Methods in Natural Language Processing, Sep. 2015.

Koichi Kamijo et al., Personality Estimation from Japanese Text, Proceedings of the Workshop on Computational Modeling of People's Opinions, Personality, and Emotions in Social Media, Dec. 2016.

Shinsuke Takeno et al., Analysis on missing words in neural Japanese-English machine translation, Proceedings of the 23rd Annual Meeting of the Linguistic Society of Japan (Mar. 2017).

Imankulova Aizhan et al., Creation of high-quality large-scale pseudo-bilingual corpus by reverse translation, Proceedings of the 23rd Annual Meeting of the Linguistic Society of Japan (Mar. 2017).

Shinsuke Takeno et al., Analysis on missing words in neural Japanese-English machine translation, Proceedings of the 23rd Annual Meeting of the Linguistic Society of Japan (Mar. 2017), English Translation retrieved from Google Translate.

Imankulova Aizhan et al., Creation of high-quality large-scale pseudo-bilingual corpus by reverse translation, Proceedings of the 23rd Annual Meeting of the Linguistic Society of Japan (Mar. 2017), English Translation retrieved from Google Translate.

* cited by examiner

TEXT ANALYSIS IN UNSUPPORTED LANGUAGES USING BACKTRANSLATION

BACKGROUND

Technical Field

The present invention generally relates to the analysis of text in various languages and, more particularly, to the determination of personality characteristics from text in languages without thorough documentation.

Description of the Related Art

Text analysis can be performed to determine a variety of characteristics of the writer. For example, a text analysis can determine personality characteristics of the writer based on word choice and writing style. However, such analysis has heretofore only been effective after an extensive survey has been performed of the language in question, to determine the relationships between language features and writer personality.

SUMMARY

A method for text analysis includes determining one or more global analysis parameters based on backtranslation of a first corpus between supported languages. A new text analysis model is determined for an unsupported language based on the one or more global analysis parameters and a text analysis model for a first supported language. An input text is analyzed in the unsupported language with the new text analysis model.

A computer-implemented method for delivering personality-appropriate advertising to a user in an unsupported language includes determining one or more global analysis parameters based on backtranslation of a first corpus between supported languages by determining a usage change characteristic from a change frequency across one or more categories between the first corpus and the backtranslated first corpus. A new personality estimation model is determined for an unsupported language based on the one or more global analysis parameters and a text analysis model for a first supported language by backtranslating a second corpus between the unsupported language and the first supported language and determining a usage change characteristic for the unsupported language based on the backtranslation of the second corpus. A personality characteristic of an author of an input text in the unsupported language is estimated with the new personality estimation model, using a processor, by counting a number of words from the input text associated with each of a plurality of personality categories. A product is advertised to a user in the unsupported language based on the estimated personality characteristic.

A text analysis system includes a supported language module configured to determine one or more global analysis parameters based on backtranslation of a first corpus between supported languages. A language adaptation module is configured to determine a new text analysis model for an unsupported language based on the one or more global analysis parameters and a text analysis model for a first supported language. A text analysis module includes a processor configured to analyze an input text in the unsupported language with the new text analysis model using a processor.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide text analysis for languages that have not had a complete survey performed. To accomplish this, the present embodiments determine a usage change characteristic using back translation between the language in question and a known language. A text can then be analyzed by translating it to the known language and applying the usage change characteristic to account for differences between the known language and the original language.

In one specific embodiment, the text analysis is performed as a personality analysis, estimating the personality state of the writer of the text being analyzed. The analysis may be used to create a personality model by determining the frequencies of various language features within the text and can, for example, break the writer's personality into scores for agreeableness, conscientiousness, extraversion, neuroticism, and openness in accordance with the Big5 personality model. It should be understood that, although personality analysis is specifically contemplated, the present principles apply to other forms of text analysis as well.

In general terms, personality estimation assigns the words in a dictionary to a set of different categories, each associated with a personality characteristic. The words in an input text are then counted with respect to which categories they represent. An input text can then have a personality estimated based on the frequency of appearance of the various categories. To achieve this, the assignment of words to the set of different categories is performed using extensive survey information. The surveys in question may, for example, ask a set of simple questions to survey-takers, where the questions are designed to determine what personality characteristics are associated with words in a given language.

Potential applications for such personality estimation include, for example, matching people to appropriate job roles, product/service recommendations, etc. As a result of increasing globalization, cross-border retail and personnel exchanges take place across linguistic borders, making it increasingly important to estimate personality regardless of the country and language used to provide accurate service.

Figure 1:
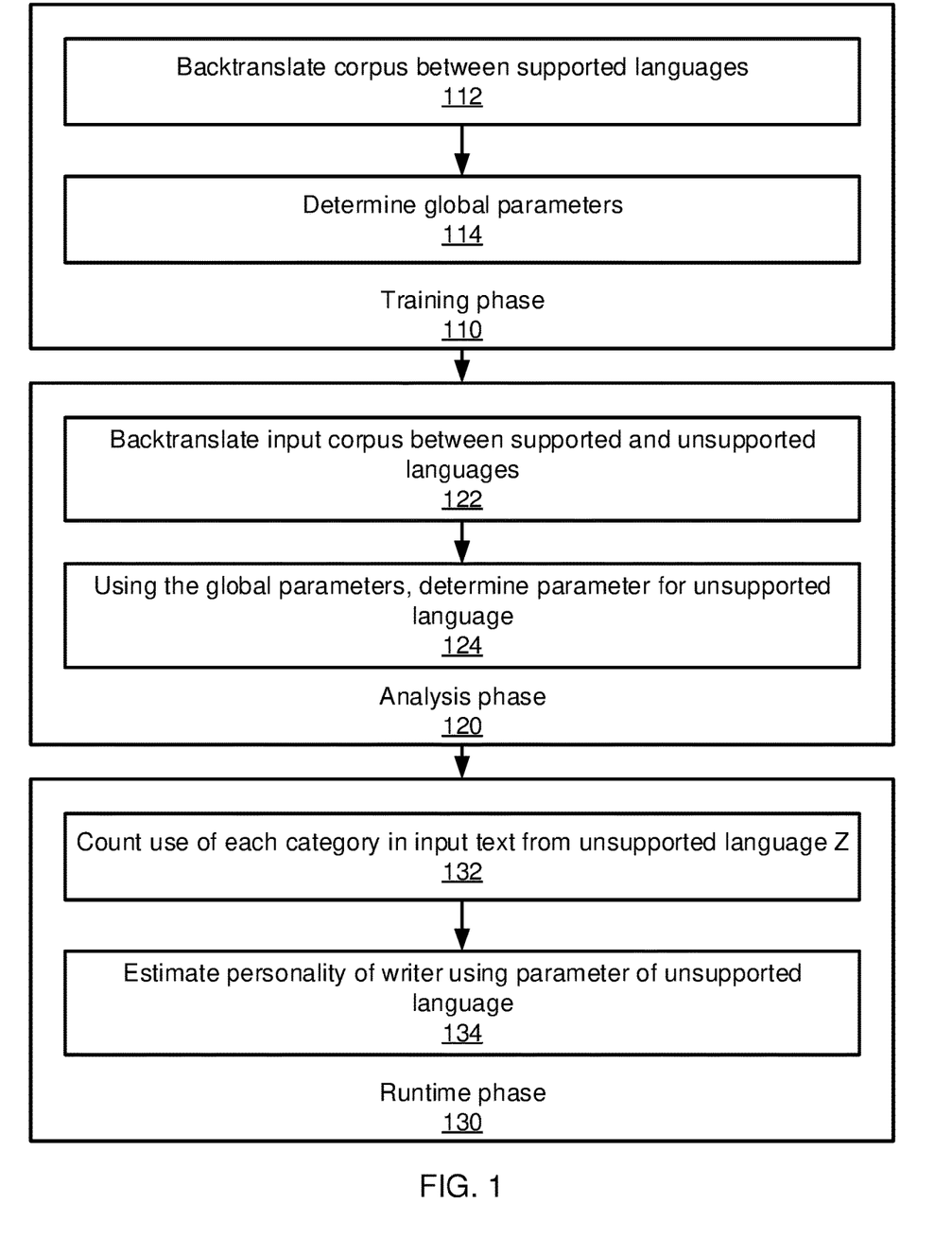
FIG. 1 is a block/flow diagram of a method for performing a text analysis, such as personality estimation, on a text written in a language that lacks a native analysis model using backtranslation between supported languages to generate global parameters in accordance with an embodiment of the present invention.

Referring now to FIG. 1, a method for performing text analysis on an input text is shown. Three phases are shown—a training phase 110, an analysis phase 120, and a runtime phase 130. In the training phase, a set of global parameters are determined using only supported languages. These global parameters represent the general effects of backtranslation. The analysis phase then uses backtranslation to capture a specific usage change characteristic between a supported language and an unsupported language, and determine the parameters for the unsupported language, along with the global parameters. The runtime phase estimates the personality of a writer who use the unsupported language, using the parameters determined in the analysis phase.

In this example, texts in a supported language will be designated A and B, while a text in an unsupported language will be designated C. It should be understood that these can refer to any language, with the difference being that a native analysis model exists for the supported language and does not exist for the unsupported language. The native analysis model provides the ability to perform text analysis on the supported language, for example by determining personality characteristics of the writer of a text in the supported language.

The training phase 110 has two main portions—the backtranslation in block 112 of many corpuses from a first supported language (X) into a second supported language (Y) and then back again, and the determination in block 114 of global parameters based on the back translation of block 112. It should be understood that samples of hundreds or more corpuses may be used, but that embodiments having even more (e.g., thousands of corpuses) will provide better results. X represents just one language, but Y can represent one or more languages. The analysis phase similarly has a first backtranslation block 122, translating the corpuses from a supported language to the unsupported language (Z) and then back again, followed by an analysis block 124 that uses the results of backtranslation block 122 to determine the parameter ($C_j^{XZ}$) for the unsupported language. In the runtime phase 130, an input text in the unsupported language is inputted in block 132, the usage of each category in the text is counted in block 134, and, using the parameter obtained in block 124, the personality of the input text in language Z is estimated.

Figure 2:
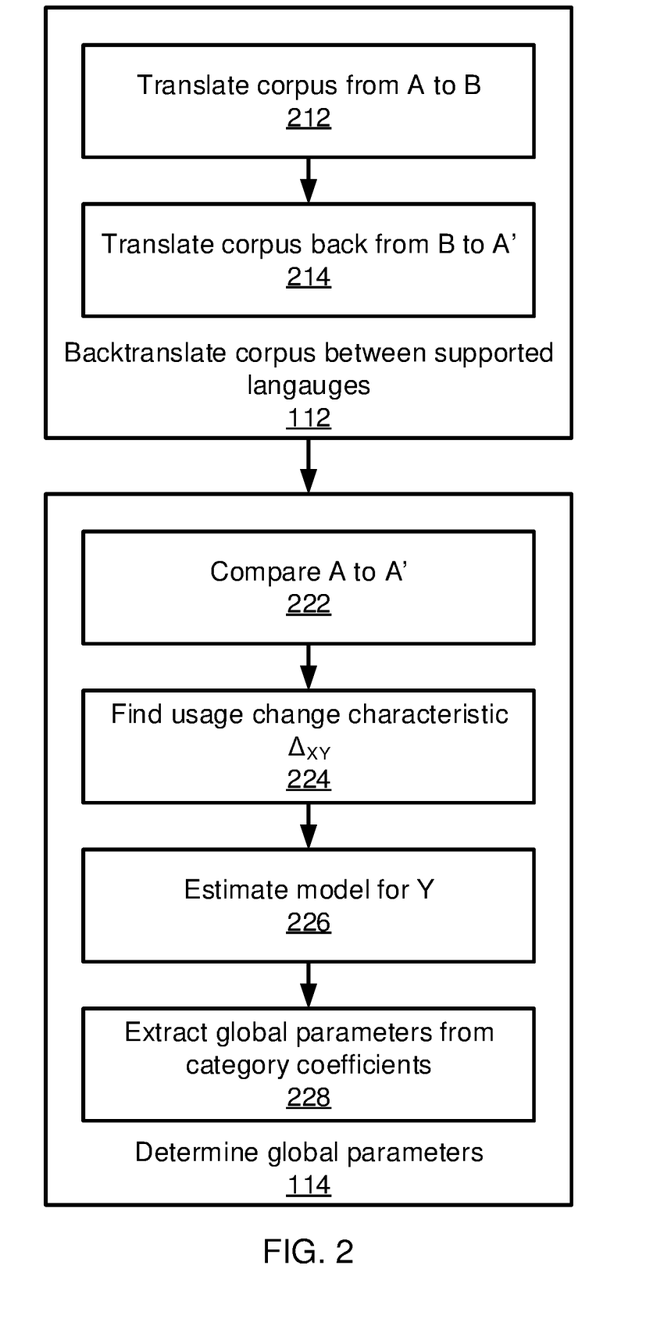
FIG. 2 is a block/flow diagram of a method for determining the global parameters based on backtranslation of corpuses between supported languages in accordance with an embodiment of the present invention.

Referring now to FIG. 2, additional detail on the steps of training phase 110 are shown. Block 112 performs a translation of a corpus A from a supported language X into a translated corpus B in a second supported language Y. This translation can be performed using any appropriate automated tool or even by a human translator. Block 104 then translated the text back from language Y to language X, with the backtranslated version being designated A'. Thus backtranslated text A' will include roughly the same content as the original input text, but will have some differences that arise from the translation process.

These backtranslation errors can be caused by, for example, the translator making selections for a best fit to the original meaning when multiple possibilities are available or a more nuanced word in one language lacking a direct equivalent in another language. The backtranslated text A' will therefore have differences from the original text that are characteristic of the differences between the languages before and after backtranslation. The present embodiments use these differences to essentially backtranslate a text analysis that is performed on a translated text in a supported language.

Block 222 therefore compares the original corpus A to the backtranslated corpus A'. The backtranslation errors that are discovered by block 222 are used by block 224 to determine the usage change characteristic between language X and language Y, designated herein as $\Delta_{XY}$. It is specifically contemplated that $\Delta_{XY}$ may represent the differences in frequencies for each of a set of different language features.

Block 226 then creates an analysis model for the language Y using $\Delta_{XY}$ and an analysis model for the language X. Some embodiments may use a linear regression to determine the new analysis model, but it should be understood that any appropriate process may be used instead. Block 228 then extracts global parameters from category coefficients in the corpus after backtranslation and the average frequencies of each category after backtranslation. This model estimation may be performed for multiple different languages Y to help with subsequent extraction of global parameters.

In some embodiments, the analysis models may be formed using a tool called Linguistic Inquiry and Word Count (LIWC), though it should be understood that other processes may be used instead. LIWC identifies words in an input text that are associated with a set of relevant categories. The frequency of words in each category characterizes the input text according to certain psychological qualities. For example, the word "cried" could belong to multiple different categories, indicating "sadness," "negative emotion," "overall affect," "verb," and, "past focus." Thus each category is incremented for every associated word in the text. The categories may furthermore be hierarchically organized, for example with a "sadness" word triggering increments in both "sadness" and "negative emotion."

In the case of LIWC, the process is governed by one or more dictionaries for the supported language that establish associations between individual words and the categories. Building such a dictionary involves a substantial amount of work, as each word must be classified according to a potentially large set of categories.

Thus, the operation of block 224 in embodiments that use LIWC is to compare the frequencies of words in each category between the original corpus A and the backtranslated corpus A'. The usage change characteristic $\Delta_{XY}$ will then represent differences in word frequency for each category.

The following designations will be used below:

$A_i$: A text written in a language A.

$T_{A \to B}(A_i)$: A translation of a text $A_i$ to a target language B.

$A_i^B$: A text in language A that has been translated from language B.

$A_i^{BC}$: A text in language A that has been translated from language C to B then to language A.

$C_A(B_i)$: A vector of frequencies of each category of a text $B_i$ using language A.

$P_A(B_i)$: Estimated personality of the text $B_i$ using analysis model for language A.

$c_j$: A coefficient for LIWC category j.

$N_j(A_i)$: A count for the category j in the text $A_i$.

$\overline{n}_j^{ABC}$: An average frequency for a category j after translation from language A to language B to language C.

Thus, for a supported language X and an unsupported language Y, the original corpus $X_i$ is backtranslated as follows:

$$Y_i^X = T_{X \to Y}(X_i)$$

$$X_i^{YX} = T_{Y \to X}(Y_i^X)$$

The usage change characteristic $\Delta_{XY}$, calculated by block 224, is then defined as the difference between the vectors that represent the category frequencies for the original corpus and the backtranslated corpus:

$$\Delta_{XY} = C_X(X_i) - C_X(X_i^{XY})$$

Thus, being a difference between category vectors, the usage change characteristic $\Delta_{XY}$ is also represented as a category vector, with each value representing the difference in frequency for that particular category.

The challenge of block 226 is then to create the model $P_Y(Y_i)$, which makes text analysis of the text $Y_i$ in its native language Y, even though Y is already a supported language. To accomplish this, the native analysis model $P_X(X_i)$ for the language X is used, along with $\Delta_{XY}$. The new model can then be generally defined according to a general function:

$$P_Y(Y_i) = F(\Delta_{XY}, P_X(X_i^Y), X_i^Y)$$

It should be understood that any appropriate process may be used to determine the form of the function F. In one specific example, linear regression may be used as follows:

$$P_Y(Y_i) = \sum_j c_j^{XY} N_j(X_i^Y) + P_X(X_i^Y) + \delta$$

where $\delta$ is a constant value in the linear regression.

Assuming that the coefficients $c_j$ can be calculated based on global coefficients that are independent of language, defined herein as $g_j$, then the coefficients $c_j$ may be defined as:

$$c_j^{XY} = g_j G(\bar{n}_j^X, \bar{n}_j^{XYX})$$

It should be understood that this functional form for the coefficients $c_j$ is just one example. In other embodiments, the coefficients $c_1$ may have any functional relationship to the global coefficients $g_j$. Any appropriate value for the function G may be used. In one specific example, G may be expressed as follows. This particular expression of G yields a good estimation when x is close to 1:

$$G(n) = \begin{cases} \min\left(\frac{1}{|1-x|}, a_0\right), & x_0 \le x \le X_1 \\ 0, & x < x_0; x > x_1 \end{cases}, \quad x = \frac{\bar{n}_j^{XYX}}{\bar{n}_j^X}$$

where $a_0$, $x_0$, and $x_1$ are experimentally determined constants.

Block 120 takes corpuses (potentially a large number of corpuses) in an unsupported language, $Z_1$. Block 122 obtains usage changes characteristic $\Delta_{XZ}$ as described above by backtranslating the corpuses in supported language X through the unsupported language Z. Using $g_j$ and G, the model may then be expressed as:

$$P_Z(Z_i) = \sum_j g_j G(\bar{n}_j^X, \bar{n}_j^{XZX}) N_j(X_i^Z) + P_X(X_i^Z) + \delta$$

This analysis model can then be applied to any text in the unsupported language Z to generate a text analysis of, e.g., the writer's personality. This can be accomplished even if there are few available corpuses in the unsupported language, as the original corpus is from a supported language. There is no need to generate a detailed model of the unsupported language.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Embodiments of the present invention have been tested by determining models for supported languages and comparing the newly calculated models with the true model. For example, using Japanese as the language X and a variety of other supported languages (e.g., English, Arabic, and Spanish) as languages Y and Z, the mean average error (MAE) between the calculated model and the true model is calculated. The results are shown as an improvement of the calculated model for language Z versus using the model for X on text translated from Z to X as compared to the true model.

The first experiment, shown in table 1 below, used Japanese as language X, English and Spanish as languages Y, and Arabic as language Z.

TABLE 1

| Z = ar, Y = en, es, X = ja | Improvement % |
| --- | --- |
| Big5 agreeableness | 9.66% |
| Big5 conscientiousness | 66.70% |
| Big5 extraversion | 25.60% |
| Big5 openness | 1.97% |
| Average | 30.80% |

The second experiment, shown in table 2 below, used Japanese as language X, English and Arabic as languages Y, and Spanish as language Z.

TABLE 2

| Z = es, Y = ar, en, X = ja | Improvement % |
| --- | --- |
| Big5 agreeableness | 21.66% |
| Big5 conscientiousness | 34.33% |
| Big5 extraversion | 2.70% |
| Big5 openness | 0.17% |
| Average | 11.48% |

The third experiment, shown in table 3 below, used Japanese as language X, Arabic and Spanish as languages Y, and English as language Z.

TABLE 3

| Z = en, Y = ar, es, X = ja | Improvement % |
|---|---|
| Big5 agreeableness | 41.98% |
| Big5 conscientiousness | 57.47% |
| Big5 extraversion | 22.76% |
| Big5 openness | 22.71% |
| Average | 36.05% |

The present embodiments therefore provide substantial improvements in analyzing the personality of texts in unsupported languages as compared to performing an analysis on a text that has been translated to a supported languages.

Figure 3:
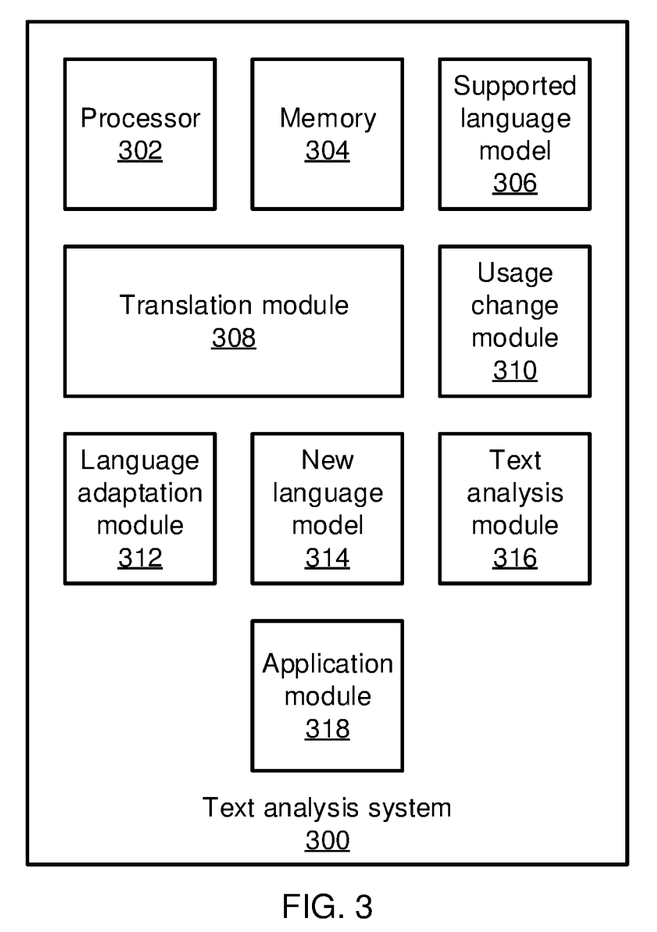
FIG. 3 is a block diagram of a text analysis system that performs text analysis, such as personality estimation, on a text written in a language that lacks a native analysis model using backtranslation between supported languages to generate global parameters in accordance with an embodiment of the present invention.

Referring now to FIG. 3, a text analysis system 300 is shown. The system 300 includes a hardware processor 302 and memory 304. Stored in the memory is a supported language module 306. The system 300 also includes one or more functional modules that may, in some embodiments, be implemented as software that is stored in memory 304 and that is executed by hardware processor 302. In other embodiments, the functional modules may be implemented in the form of one or more discrete hardware components such as application specific integrated chips or field programmable gate arrays.

A translation module 308 translates a corpus from a first language into a second language and then back again. A usage change module 310 determines differences between category frequencies in the original corpus and category frequencies in the backtranslated corpus to generate the usage change characteristic between the languages.

A language adaptation module 312 uses the output of the usage change module 310 and the supported language model 306 to generate a new language model 314 for an unsupported language. Block 316 then uses the new language model 314 to perform a text analysis (e.g., personality estimation) on an input text in the unsupported language.

An application module 318 makes use of the personality estimate provided by the text analysis module 316 to, for example, provide advertising to a user in an unsupported language, match a user to a personality-appropriate job role, match between users having compatible personalities, etc. This provides a distinct advantage in any context where personality estimation is unavailable in a given language due to the lack of sufficient survey data being done to create a native personality estimation model.

Figure 4:
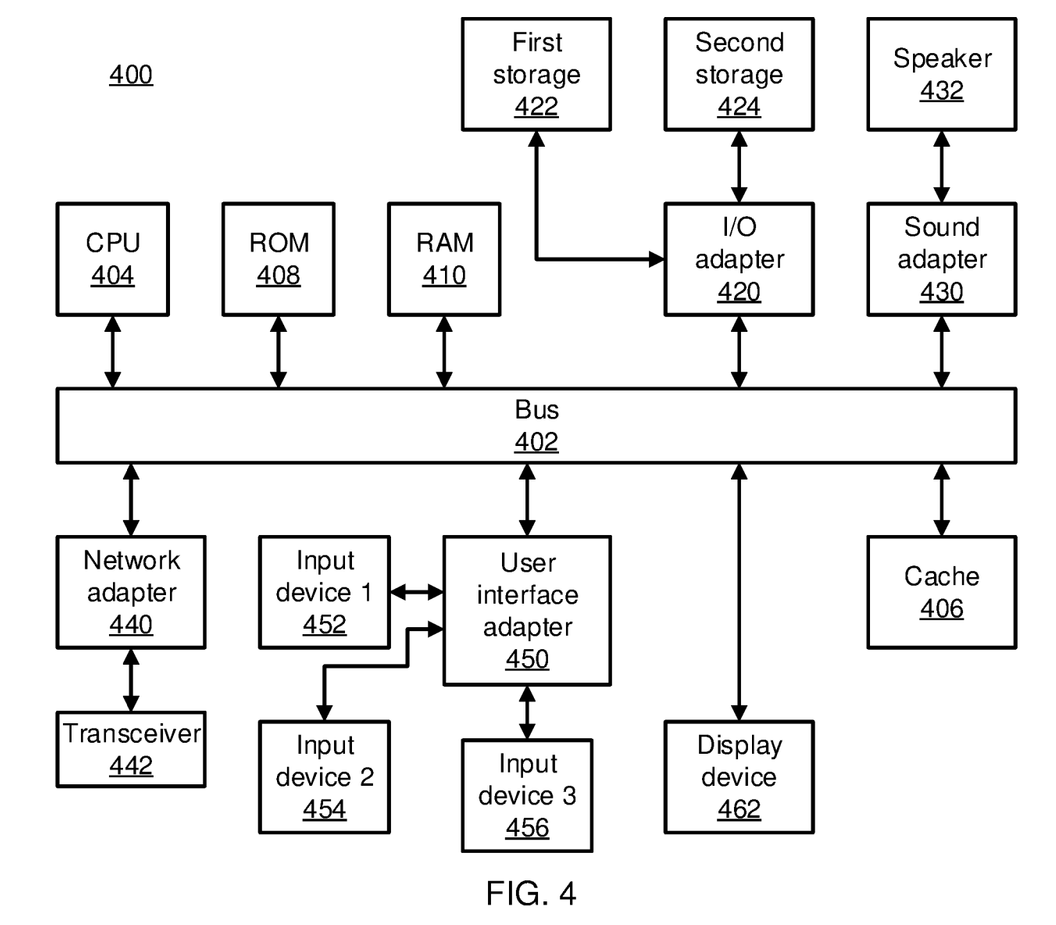
FIG. 4 is a block diagram of a processing system in accordance with an embodiment of the present invention.

Referring now to FIG. 4, an exemplary processing system 400 is shown which may represent the text analysis system 300. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Having described preferred embodiments of text analysis in unsupported languages (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for text analysis, comprising:
    determining one or more global analysis parameters based on backtranslation of a first corpus between supported languages, including a usage change characteristic from a change in frequency across one or more categories between the first corpus and the backtranslated first corpus;
    determining a new text analysis model for an unsupported language based on the one or more global analysis parameters and a text analysis model for a first supported language; and
    analyzing an input text in the unsupported language with the new text analysis model, to determine a personality characteristic of an author of the input text, using a processor.

2. The computer-implemented method of claim 1, wherein backtranslation consists of translating a text from a first language to a second language and then translating the post-translation text from the second language back to the first language.

3. The computer-implemented method of claim 1, wherein determining a personality characteristic of the text comprises counting a number of words from the input text associated with each of a plurality of personality categories.

4. The computer-implemented method of claim 1, further comprising advertising a product to a user in the unsupported language based on a determined personality characteristic.

5. The computer-implemented method of claim 1, wherein determining the one or more global analysis parameters comprises backtranslation between a first supported language and a plurality of other supported languages.

6. The computer-implemented method of claim 1, wherein analyzing the input text comprises backtranslating a second corpus between the unsupported language and the first supported language.

7. The computer-implemented method of claim 6, wherein analyzing the input text comprises determining a usage change characteristic for the unsupported language based on the backtranslation of the second corpus between the unsupported language and the first supported language and based on the one or more global analysis parameters.

8. A non-transitory computer readable storage medium comprising a computer readable program for text analysis, wherein the computer readable program when executed on a computer causes the computer to perform the steps of:
    determining one or more global analysis parameters based on backtranslation of a first corpus between supported languages, including a usage change characteristic from a change in frequency across one or more categories between the first corpus and the backtranslated first corpus;
    determining a new text analysis model for an unsupported language based on the one or more global analysis parameters and a text analysis model for a first supported language; and
    analyzing an input text in the unsupported language with the new text analysis model, to determine a personality characteristic of an author of the input text, using a processor.

9. A text analysis system, comprising:
    a supported language module configured to determine one or more global analysis parameters based on backtranslation of a first corpus between supported languages, including a usage change characteristic from a change in frequency across one or more categories between the first corpus and the backtranslated first corpus;
    a language adaptation module configured to determine a new text analysis model for an unsupported language based on the one or more global analysis parameters and a text analysis model for a first supported language; and
    a text analysis module comprising a processor configured to analyze an input text in the unsupported language with the new text analysis model, to determine a personality characteristic of an author of the input text.

10. The text analysis system of claim 9, wherein backtranslation consists of translating a text from a first language to a second language and then translating the post-translation text from the second language back to the first language.

11. The text analysis system of claim 9, wherein the text analysis module is further configured to count a number of words from the input text associated with each of a plurality of personality categories.

12. The text analysis system of claim 9, further comprising an application module configured to advertise a product to a user in the unsupported language based on a determined personality characteristic.

13. The text analysis system of claim 9, wherein the supported language module is further configured to backtranslate between a first supported language and a plurality of other supported languages.

14. The text analysis system of claim 9, wherein the text analysis module is further configured to backtranslate a second corpus between the unsupported language and the first supported language.

15. The text analysis system of claim 14, wherein the text analysis module is further configured to determine a usage change characteristic for the unsupported language based on the backtranslation of the second corpus between the unsupported language and the first supported language and based on the one or more global analysis parameters.

* * * * *